Sept. 20, 1955     M. B. KIRKLIN     2,718,104
V-BLOCK
Filed Oct. 8, 1953     2 Sheets-Sheet 1
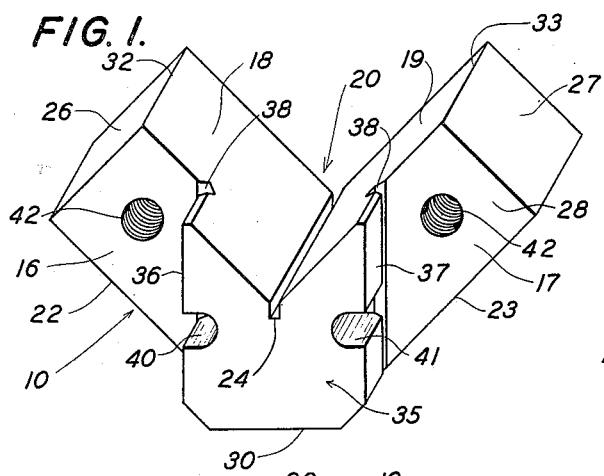
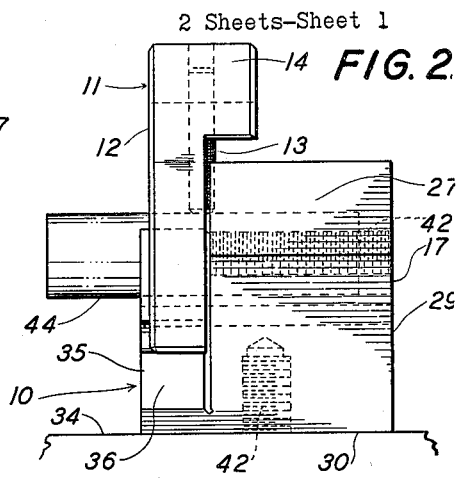
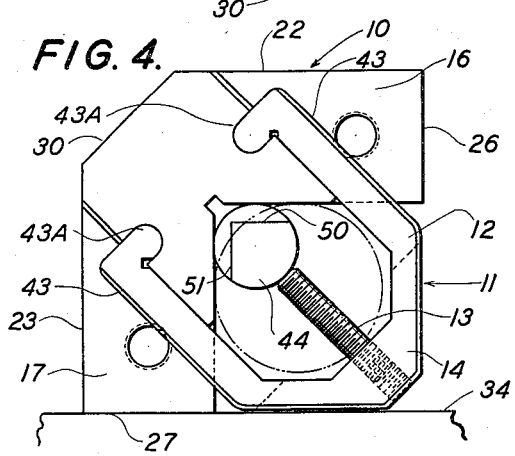
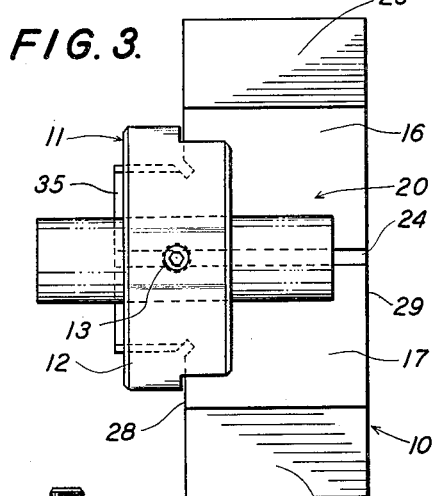
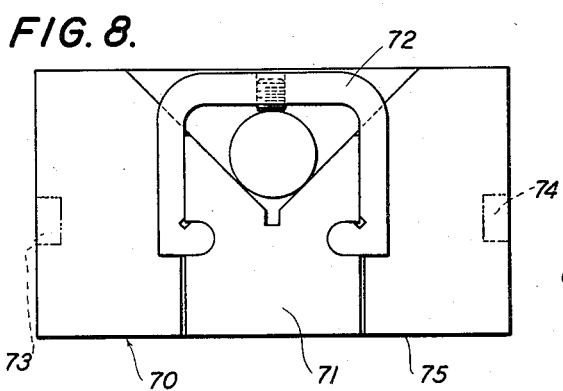
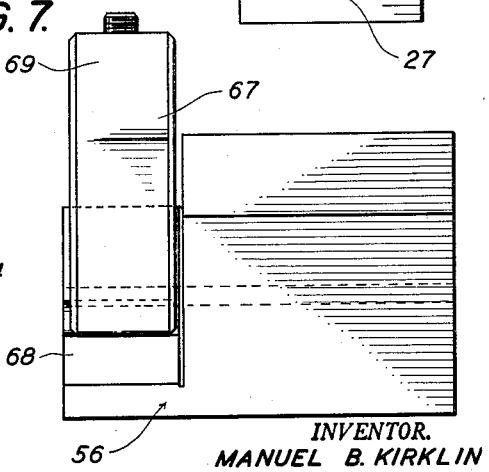
INVENTOR.
MANUEL B. KIRKLIN
BY
James P. Christie
ATTORNEY Sept. 20, 1955 M. B. KIRKLIN 2,718,104
V-BLOCK Filed Oct. 8, 1953 2 Sheets-Sheet 2

INVENTOR.
MANUEL B. KIRKLIN
BY
*James B. Christie*
ATTORNEY

United States Patent Office 2,718,104
Patented Sept. 20, 1955

2,718,104

V-BLOCK

Manuel B. Kirklin, Monterey Park, Calif.

Application October 8, 1953, Serial No. 384,990

3 Claims. (Cl. 51—220)

This invention relates to the field of fixtures for holding work pieces during layout or machining, and particularly to the family of tools known as V-blocks and angle plates.

Surface grinding of flats and squares on cylindrical work pieces such as gages, punches, shafts, etc. is usually done by clamping the piece in a V-block with the portion to be ground projecting from one end of the block. The standard V-block is basically a metal block containing a cavity of V-shaped cross-section extending the length of the block, and having a bottom surface normal to the plane bisecting the V-shaped cavity. Ordinarily the V-block is chucked magnetically or mechanically beneath a grinding wheel and the desired cut is made.

Since time is an important cost factor in all manufacture, most grinders utilize quick-releasing magnetic chucks. A V-block can be quickly released from this type of chuck, but time gained thusly is normally lost in the tedious process of unclamping, re-setting and re-clamping the work-piece in the V-block.

For instance, in grinding a square on the end of a gage, after the first flat is ground, the piece must be unclamped from the V-block, reset in the block with respect to the first flat by means of angle plate or protractor, and then reclamped before the second flat can be ground.

This process must be repeated for each of the two remaining cuts necessary to form the desired square.

The V-block assembly of my invention eliminates the necessity of resetting and reclamping work pieces in the V-block after each operation, and results in a great saving of time and measuring-tool investment, since the invention also achieves the squaring of a work piece end with no recourse to the aforementioned tools.

A further saving is possible because the V-block itself can be fabricated in an average shop without use of these tools.

My invention contemplates a V-block comprising a metal block defining a cavity of V-shaped section extending between one pair of opposite faces of the block with a projection extending from one of these faces. The projection includes surfaces forming a continuation of surfaces of the cavity and is provided with symmetrically disposed indentations at points below the cavity. A U-shaped clamp is slideable in the indentations and is operable to clamp an object within the cavity symmetrically disposed with relation to the cavity apex.

The preferred V-block comprises a metal block defining a cavity of V-shaped cross-section which is a 90° dihedral. The outer surfaces of the block are parallel to the inner dihedral surfaces and are spaced equidistant from the respective inner surfaces. The projection from the outer face is approximately one fourth the length of the V-block.

The bottom surface of the block is perpendicular to the bisecting plane of the dihedral and preferably has a width equal to the distance between the inner and outer surfaces. This preferred form of block can be considered as comprising a truncated V in its external configuration.

In the preferred embodiment of the invention the clamp is proportioned so that its outer edges are within the confines of a volume created by the extension of the outer plane surfaces of the V-block.

Thus, no part of the clamp interferes with resting the V-block on a plane surface in any of the positions afforded by the arrangement of the outer surfaces of the block. In the preferred form of the block a pair of these outer surfaces are normal to each other so the block may also be used as a small angle plate.

Other features and advantages of the invention will become apparent from the following detailed description taken with reference to the drawing in which:

Fig. 1 is a cabinet perspective view of the preferred form of the V-block of the invention;

Fig. 2 is a side elevation of the assembled tool;

Fig. 3 is a plan view of the tool of Fig. 2;

Fig. 4 is a front elevation of the tool in a rotated position;

Fig. 7 is a side elevation of the embodiment of Fig. 5 showing clamping means similar to that of Fig. 2; and Fig. 8 is a front elevation of a V-block of approximately presently standard configuration modified to accommodate the improved clamping means of the invention.

Figure 5:
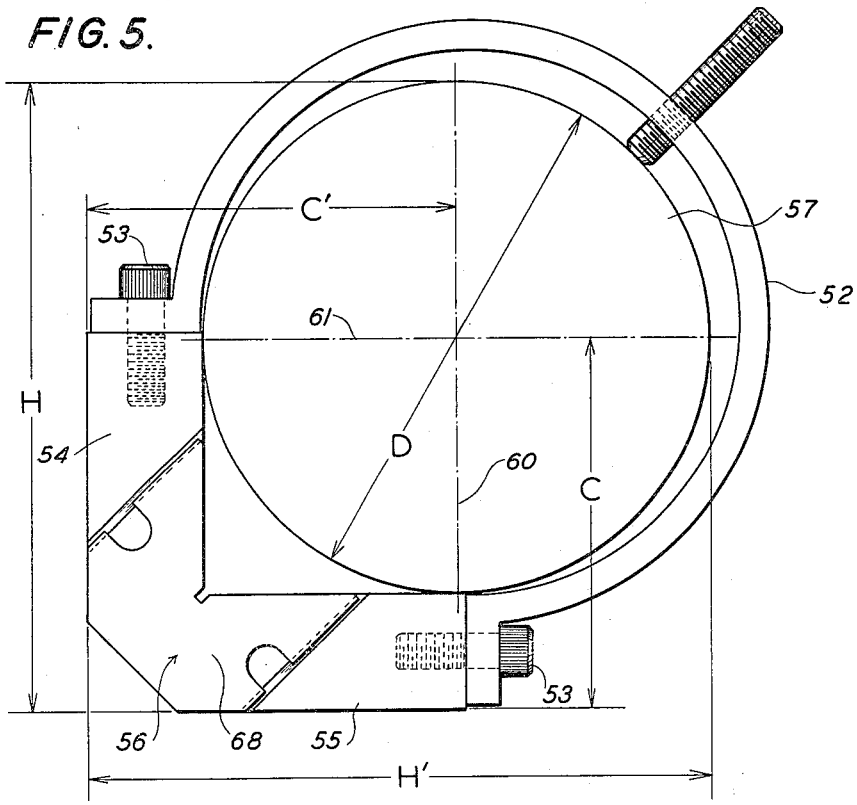
Fig. 5 is a reduced scale, front elevation of a large V-block of the preferred shape, adapted to receive large work pieces.

The preferred embodiment of my invention comprises a V-block 10 and a clamp assembly 11. The clamp assembly comprises a U-shaped frame member 12 having adjustable fastening means, such as a screw 13, mounted in the loop 14 of the U, i. e. that portion interconnecting the legs of the U.

The V-block of Figs. 1, 2, 3 and 4 has a dihedral formed by two diverging arms 16, 17 of equal extension from the apex of the defined dihedral. The arms diverge at an angle of 90°, so that their inner surfaces 18, 19 form the conventional V-trough 20 of a V-block. Diverging outer surfaces 22, 23 are parallel to and equidistant from their respective inner surfaces 18, 19.

Because the trough has a conventional grinding relief slot 24 extending the length of the dihedral apex, the true apex is the imaginary line formed by the intersection of the extended planes of the dihedral.

The respective outer faces 26, 27 of the arms are parallel to the apex of the dihedral and perpendicular to the inner and outer surfaces of the respective arms whereby the outer end face of one arm is parallel to the inner and outer surfaces of the opposite arm.

The front face 28 and the rear face 29 of the V-block are perpendicular to the dihedral apex and are thus parallel to each other. The distance between the front and rear faces is determined by the working trough surface required in the normal use of the block.

The bottom surface 30 of the V-block is parallel to the apex of the dihedral and it is perpendicular to and symmetrically oriented with respect to the plane bisecting the angle made by the arms 16, 17 of the V-block.

Because the arms of the block extend an exactly equal distance from the apex of the dihedral, the angular relationship between the bottom surface 30 and the outer diverging surfaces 22, 23 may be achieved without the usually required sine bars or protractors. To form the bottom face 30, the block 10 is inverted and its normally upper extreme edges 32, 33 are placed on a magnetic chuck or other planar, holding surface 34 and the apex of the outer surfaces 22, 23 is ground flat to form a bottom surface of the desired width.

This operation is accurate and simple. It lowers fabricating costs because it does not entail investing in expensive measuring tools or layout and setup time.

Because the bottom surface 30 is perpendicular to the bisecting plane of the 90° dihedral, the bottom surface makes an angle of 45° with each of the diverging outer surfaces 22, 23. This relationship is useful in layout work, finding centers, etc.

The V-shaped configuration of the block is modified by a projection 35 from the front surface 28 of the block. The projection provides means for clamping work pieces in the V-block without interfering with the versatility inherent in the unique shape of the block.

The projection 35 continues the bottom surface 30 and the V-trough 20 of the block. However, the extent of the trough is curtailed by sides 36, 37 of the projection that are perpendicular to the bottom surface 30 and to the block face 28 from which they project. Slots 38 at the intersections of sides 36, 37 and block face 28 provide grinding relief.

Parallel and transversely aligned grooves 40, 41 extend across the width of the sides 36, 37 to accommodate the clamp assembly 11.

The front face of the projection 35 is parallel to the front and rear faces of the block proper so that all of the surfaces of the block are accurate planes of reference for precise work.

Threaded mounting holes 42 may be located conveniently in the block to allow for various attaching situations.

The preferred clamp assembly permits the unhampered use of all surfaces of the V-block. The clamp of Figs. 2, 3 and 4 has a loop 14 that is strengthened to receive the screw 13 by increasing the thickness of the loop on the side away from the face of the projection 35 in order that the face may be utilized. The end of each leg 43 of the clamp is turned inward to form a dog 43A that approximately conforms in shape to the respective groove in each side of the projection. The legs and the loop are of a suitable thickness to keep the entire clamp assembly within the volume formed by the planes of the outer surface of the block.

Fig. 4 shows clearly this feature of my invention. In addition to the ease of finding centers of cylindrical work pieces with the V-block of Figs. 1 to 4, the block is useful in locating and grinding flats or squares on shafts, punches, gages and like parts.

The unique usefulness of the described preferred V-block is apparent in the following description of its use in grinding flats on a work piece:

In Fig. 4 a plug gage 44 is the piece being worked and it is clamped in the V-block 10 by the clamp screw 13. The V-block is chucked, as it is for each succeeding operation, on a magnetic chuck. A flat 50 is ground on the gage with the outer end face 27 of the V-block referenced against the horizontal surface 34 of the chuck. Since the clamp does not interfere with supporting the block on any of the block's outer surfaces, the V-block is rotated after unchucking and opposite outer end face 26 is referenced against the face of the chuck. Then the block is rechucked and a second flat 51 is ground at right angles to the first flat.

A third flat and a fourth flat are ground in the same sequence of steps to form the squared end on the gage. The third flat is ground with outer surface 22 referenced against the chuck face 34, and the fourth flat is ground while the opposite outer surface 23 is referenced against the chuck face.

The accuracy and speed possible when the work in the V-block need not be unclamped, re-registered with respect to each succeeding flat ground, and re-clamped, is unique to the block and clamp of my invention.

The bottom surface 30 affords means for quick and accurate grinding of a flat at an angle of 45° (or 135°) to a previously ground flat formed with the V-block resting on any of its other outer surfaces.

Fig. 5 illustrates a larger V-block similar in shape to the V-block of Fig. 1.

A loop clamp 52 fastened by screws 53 to the outer ends of diverging arms 54, 55 of the block 56, shown in Fig. 5, allows the block to accommodate a piece 57 whose diameter "D" is nearly equal to twice the length of the inner surface of each of the diverging arms 54, 55. Because of the novel V-shape of the block a vertical perpendicular through the center of gravity of any work piece within the capacity of the V-block will always be inside the confines of the V-block.

Thus there is no tendency for the block to tip even when used at capacity. In Fig. 5 the perpendicular 60 through the center of gravity of the work piece passes through the arm. The fixture is stable.

Similarly, if the block were placed on its other usable surfaces, the perpendicular through the center of gravity would still pass through the respective portion of the block and establish the stability of the assembly.

Another advantage accrues to the preferred embodiment due to the previously described equal thickness of the diverging arms 54, 55.

The center of the work piece 57 in Fig. 5 is easily found with a height gage. First the distance H from the working surface to top of work piece is found. Then the gage is set to height C by subtracting one half the known diameter D from the measured height H. This second setting is used to mark a center line 61 on the face of the work piece.

The V-block is then revolved and rested on the other arm of the block, in this instance arm 54. Since the thickness of the arms is equal and the diameter "D" does not change, the height H' and the distance C' will be the same as when the V-block was resting on the other arm, and the second setting of the height gage may be used to mark a center line that crosses the first center line 61 at the center of the work piece.

The ease of this method of marking centers is possible only with a V-block of the configuration of the preferred embodiment of my invention.

Figure 6:
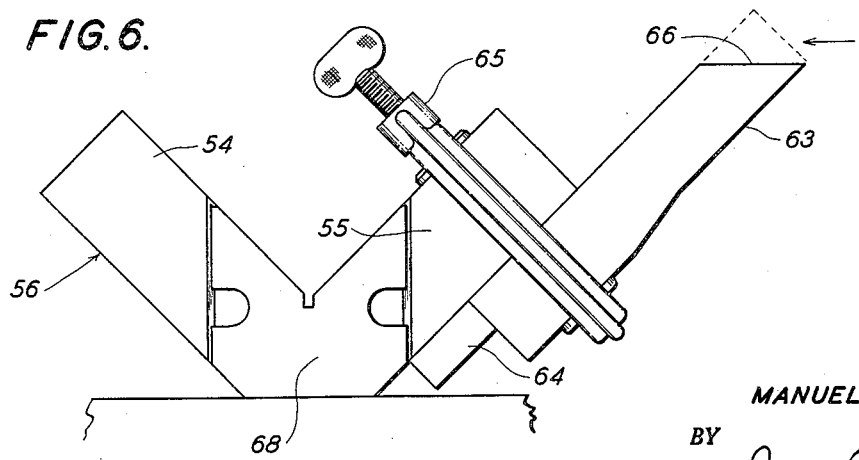
Fig. 6 is a reduced front elevation of the V-block of Fig. 5 being used as an angle plate.

The V-block 56 of Fig. 5 is used in Fig. 6 as an angle plate. In the particular instance it is desired to grind a 45° angle edge on a plate 63 which is clamped to the V-block, but the block may also be used as an angle plate when placed in the position of Fig. 5.

The plate 63 is properly aligned on a parallel bar 64 which is affixed to arm 55 of the V-block, and is held in position by means of clamps, similar to the clamp 65 shown in Fig. 6. It is now a simple operation to locate or grind the 45° angle surface 66 on the end of the plate.

In Fig. 7 the V-block 56 of Fig. 5 is used with a clamp 67 similar in shape and purpose to the clamp of Fig. 2. Use of this clamp, as in Figs. 2, 3 and 4, allows use of all surfaces of the V-block with little sacrifice of V-block capacity.

The block of Figs. 5 and 7 has a projection 68 of sufficient size to eliminate the need for additional thickening of the clamp loop 69, since the projection allows use of a clamp strong enough to accommodate a clamping screw with no increase in loop thickness.

Fig. 8 illustrates a modification of the preferred embodiment that approximates the outline of a standard V-block. The V-block 70 of Fig. 8 has a front projection 71 that receives a clamp 72 similar to the clamp of Figs. 2, 3 and 4, in that the clamp will allow the use of all outside surfaces of the block. If a conventional clamp is used bridging the block 70 from the conventional clamp grooves 73, 74 shown in broken lines in Fig. 8, only the bottom 75 of the V-block is a useful surface of reference. In contrast, the block illustrated in Fig. 8 has four useful surfaces of reference.

Since both a large range of work pieces can be accommodated, all of the surfaces can be utilized as planes of reference, and a minimum amount of metal is required for the block, the embodiment of Figs. 1, 2, 3 and 4 is preferred to the embodiment of Fig. 8.

I claim:

1. A V-block comprising a metal block in the form of a truncated V defining a trough of V-shaped section extending between one pair of opposite faces of the block, the trough having an apex angle of 90° and the outer side surfaces of the block paralleling the corresponding dihedral surfaces of the trough with the surfaces at the outer ends of the legs of the V-block being disposed perpendicularly with respect to the side surfaces of the block, a projection extending from one of said opposite faces and including surfaces forming a continuation of the surfaces of the trough and the truncated surface of the block, and a clamp detachably mounted on the projection and bridging the trough in the projection and operable to clamp an object within the trough symmetrically disposed with relation to the trough apex.

2. A V-block according to claim 1 wherein the truncated surface is perpendicular to the plane bisecting the trough, and the clamp is dimensioned to reside within a volume defined by an extension of the outer surfaces of the block.

3. A V-block comprising a metal block in the form of a truncated V defining a trough of V-shaped section extending between one pair of opposite faces of the block, the trough having an apex angle of 90° and the outer side surfaces of the block paralleling the corresponding dihedral surfaces of the trough, a projection extending from one of said opposite faces and including surfaces forming a continuation of the lower portion of the surfaces of the trough, the truncated surface of the block, and the lower portion of the outer side surfaces of the block that parallel the surfaces of the trough, parallel transversely aligned grooves in opposite side faces of the projection, and a clamp slidable in the grooves and operable to clamp an object within the trough symmetrically disposed with relation to the trough apex, the clamp being dimensioned to reside entirely within a volume defined by an extension of the outer surfaces of the block, and the truncated surface of the block being disposed perpendicularly with respect to a plane bisecting the trough and at a 45° angle with respect to the side surfaces of the truncated V.

References Cited in the file of this patent

UNITED STATES PATENTS

| | | |
|---|---|---|
| 1,705,629 | Wildbore | Mar. 19, 1929 |
| 2,194,089 | Johnson | Mar. 19, 1940 |
| 2,371,831 | Leming | Mar. 20, 1945 |
| 2,449,459 | Eckert | Sept. 14, 1948 |
| 2,585,594 | Snyder | Feb. 12, 1952 |

FOREIGN PATENTS

| | | |
|---|---|---|
| 336,474 | Great Britain | Oct. 16, 1930 |